Patented Aug. 9, 1949

2,478,827

UNITED STATES PATENT OFFICE 2,478,827

RECLAIMING SYNTHETIC RUBBER

Theodore A. Johnson and Harry H. Thompson, Akron, Ohio, assignors to Wingfoot Corporation, Akron, Ohio, a corporation of Delaware No Drawing. Application May 11, 1946, Serial No. 669,104

4 Claims. (Cl. 260—2.3)

This invention relates to the reclaiming or regeneration of synthetic rubber and, more particularly, to the reclaiming or regeneration of copolymers of a diene and a styrene.

There are, of course, a large number of processes and variations for reclaiming natural rubber. With the widespread use of synthetic rubbers, necessitated by the cutting off of our crude rubber supplies during the recent war, it became necessary to find suitable processes for reclaiming or regenerating these synthetic rubbers. This constituted a very serious problem and it was unfortunately found that these rubbers could not be reclaimed by the usual methods which had been commercially employed for natural rubber.

One commercial type of synthetic rubber is obtained by copolymerizing a diene with a styrene. For example, the rubber known as GR-S is the copolymer of butadiene-1,3 and styrene. When such a rubber is subjected to the usual alkali process for reclaiming natural rubber, the product, while devulcanized, is not a smooth, uniform, usable material. A principal object of the present process is to further treat such devulcanized synthetic rubber so as to put it in satisfactory condition for use.

According to the practice of the invention, scrap tires made from a diene-styrene copolymer are ground, cooked, washed and dried, according to the usual alkali process. This devulcanized material is then masticated (for example, on a mill) and, during the mechanical working, an acidic metal salt is added and worked into the rubber. This metal salt may be added dry or in solution, for example, in water or alcohol, an alcoholic solution being preferred.

As an illustration of the practice of the invention, 200 pounds of scrap tires made from GR-S (a copolymer of butadiene-1,3 and styrene) were devulcanized by the standard alkali process. The devulcanized, dried material was placed on an apron mill and a solution of two pounds of zinc chloride in one quart of alcohol was added to the bank on the mill and the batch was allowed to work for about 10 to 15 minutes after which it was strained and refined in the usual manner. The product so obtained was a very smooth, uniform product free from lumps and of very satisfactory quality.

While zinc chloride is a preferred material, various other acidic metal salts of inorganic acids may also be employed, the aluminum and zinc salts of hydrochloric, sulfuric and nitric acids having been found to work very well. Also, longer or shorter times of mechanical working than the 10–15 minutes of the example may be employed. The time will depend in part upon the character of the devulcanized stock, the equipment used for the masticating, etc. and the optimum time can be readily determined in any particular instance.

We claim:

1. A process for reclaiming a vulcanized rubber-like butadiene-styrene copolymer which comprises devulcanizing the copolymer by treatment with alkali and then masticating the devulcanized copolymer with an acidic metal salt of an inorganic acid selected from the group consisting of aluminum and zinc salts.

2. A process for reclaiming a vulcanized rubber-like butadiene-styrene copolymer which comprises devulcanizing the copolymer by treatment with alkali and then masticating the devulcanized copolymer with an aqueous solution of an acidic metal salt of an inorganic acid selected from the group of aluminum and zinc salts.

3. A process for reclaiming a vulcanized rubber-like butadiene-styrene copolymer which comprises devulcanizing the copolymer by treatment with alkali and then masticating the devulcanized copolymer with an alcoholic solution of an acidic metal salt of an inorganic acid selected from the group consisting of aluminum and zinc salts.

4. A process for reclaiming a vulcanized rubber-like butadiene-styrene copolymer which comprises devulcanizing the copolymer by treatment with alkali and then masticating the devulcanized copolymer with zinc chloride.

THEODORE A. JOHNSON.
HARRY H. THOMPSON.

REFERENCES CITED

The following references are of record in the file of this patent:

UNITED STATES PATENTS

| Number | Name | Date |
|---|---|---|
| 419,697 | Mitchell | Jan. 21, 1890 |
| 2,123,855 | Palmer et al. | July 12, 1938 |

OTHER REFERENCES

Kilbourne: India Rubber World, vol. 111, March 1945, pp. 687 to 690.